United States Patent [19]

Rabone

[11] 4,026,472

[45] May 31, 1977

[54] CONVERGENT-DIVERGENT PLUG NOZZLE

[75] Inventor: George R. Rabone, Cincinnati, Ohio

[73] Assignee: General Electric Company, Cincinnati, Ohio

[22] Filed: Nov. 12, 1968

[21] Appl. No.: 778,377

Related U.S. Application Data

[63] Continuation-in-part of Ser. No. 512,416, Dec. 8, 1965, abandoned.

[52] U.S. Cl. .................... 239/127.3; 239/265.41
[51] Int. Cl.² ................................ B64D 33/04
[58] Field of Search ..... 239/127.3, 265.33, 265.37, 239/265.39, 265.41

[56] References Cited

UNITED STATES PATENTS

| | | | |
|---|---|---|---|
| 2,620,623 | 12/1952 | Imbert | 60/230 |
| 2,857,119 | 10/1958 | Morguloff | 60/229 |
| 3,210,934 | 10/1965 | Smale | 60/265 |
| 3,424,384 | 1/1969 | Lacombe | 239/265.39 |

FOREIGN PATENTS OR APPLICATIONS

| | | | |
|---|---|---|---|
| 906,384 | 9/1962 | United Kingdom | 239/265.39 |
| 950,288 | 2/1964 | United Kingdom | 239/265.39 |

Primary Examiner—Samuel Feinberg
Attorney, Agent, or Firm—Dana F. Bigelow; Derek P. Lawrence

[57] ABSTRACT

The disclosure shows an annular convergent-divergent plug nozzle for use with a jet engine which comprises an exhaust duct with a concentric plug spaced within the duct and cooperating therewith to form a throat which is followed by an annular exhaust outlet. Means, such as conventional primary flaps, are provided to vary the throat area, and a plurality of spaced secondary flaps are hinged to the duct downstream of the throat to form a secondary nozzle. The secondary flaps can be freely floating so that they assume a position that is determined by the pressure differential across the flaps, and the nozzle is designed so that the exit diameter defined by the secondary flaps is no greater than the maximum plug diameter. Additionally, a secondary concentric casing may be provided to handle bypass air and the secondary flaps may be hinged to the casing in a freely floating manner as above due to the pressure differential. In such an application additional wall flaps are connected to the secondary flaps and cooperate with the primary or main flaps. Connecting means are used to maintain the relative positions of the main flaps and wall flaps and provide an annular opening relative to the primary flaps.

3 Claims, 4 Drawing Figures

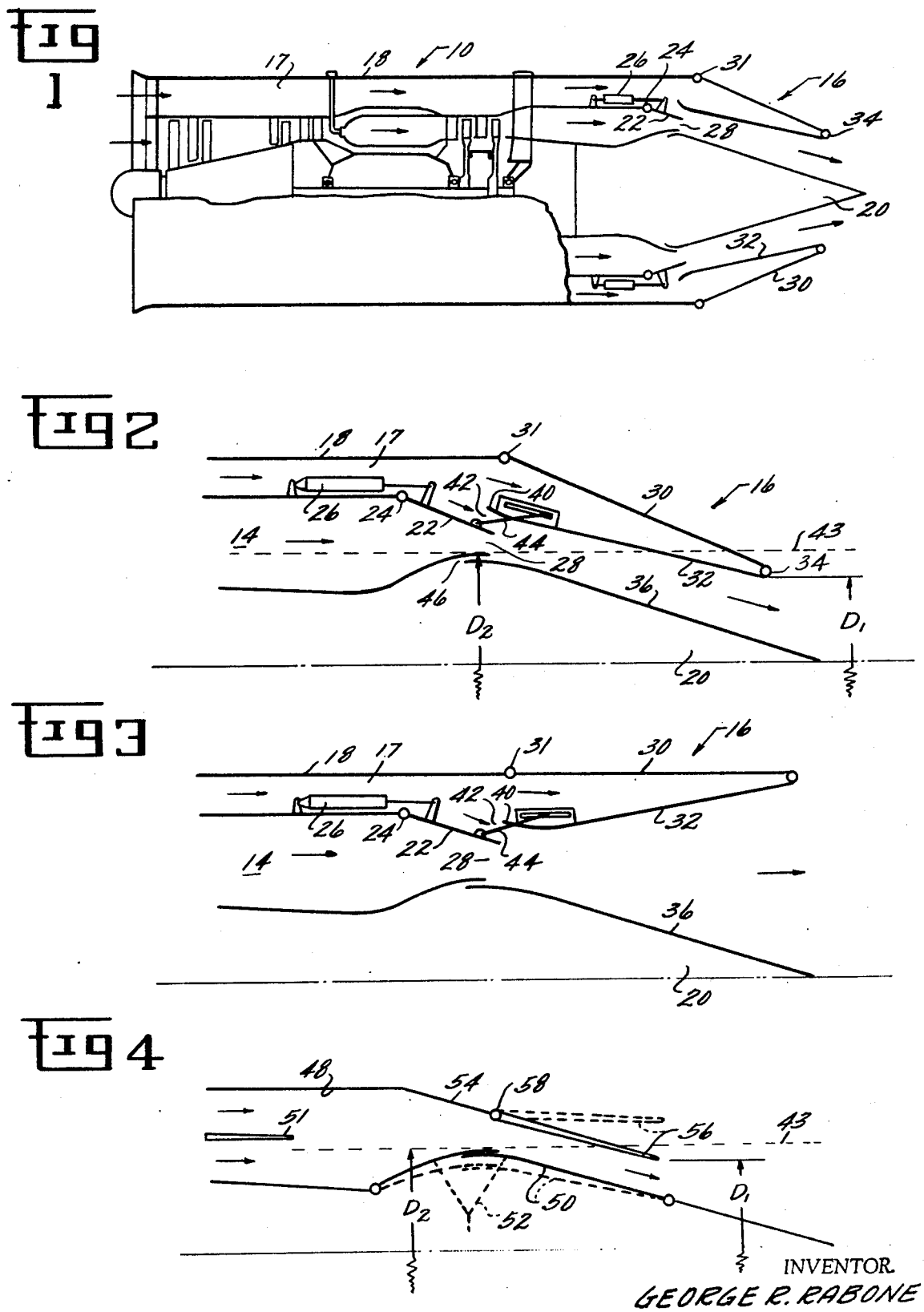

CONVERGENT-DIVERGENT PLUG NOZZLE

BACKGROUND OF THE INVENTION

This application is a continuation-in-part of my copending application Ser. No. 512,416, filed Dec. 8, 1965 now abandoned.

The present invention relates to an annular convergent-divergent plug nozzle and, more particularly, to such a nozzle for use with jet engines which includes infrared suppression means and minimum actuated variable geometry.

In high speed aircraft it is customary to use a convergent-divergent nozzle for best operation at all speeds. Such a nozzle permits satisfactory operation at low pressure ratios or at subsonic speeds, and may be opened up at high pressure ratios and high supersonic speeds. The need for such a nozzle dictates operating structure which can assume many forms and become quite complex. A common nozzle that is used for such purposes is known as a plug nozzle. This comprises a nozzle in which a center plug is used in conjunction with one or more concentric tubes to form an annular outlet. The throat area of such a nozzle may be varied by either longitudinal movement of the plug or one or more of the tubes or both. The plural tube arrangement may be used in fan engines where bypass air is employed. Alternately, a single tube with a slidable plug or a fixed plug with a slidable tube may be used or the plug may be varied radially permitting variation in throat area for operation at different conditions. Further, such nozzles generally employ movable flaps for additional exit area variation and may employ primary and secondary flaps depending on the particular arrangement employed such as whether or not dry or afterburning operation or both is to be used.

With the advent of infrared seeking missiles, the problems of protecting aircraft from ground or air to air attack increased considerably. Exhaust system designs and devices which reduce vulnerability to infrared seeking missiles are therefore required, and these devices will preferably function without seriously detracting from the performance of an exhaust system having the wide operating flexibility described above. In this connection, it is determinable that for many missions, infrared suppression is most critical at subsonic and low transonic flight speeds whereas it is not as critical at supersonic speeds. The plug nozzle combined with a secondary area variation means and certain limitations hereinafter defined is thus adaptable to satisfy the criteria described.

OBJECTS OF THE INVENTION

The main object of the present invention is to provide a convergent-divergent plug nozzle for a jet engine which includes means for suppressing infrared radiation from the engine tail pipe at subsonic and low transonic flight speeds.

Another object is to provide such a nozzle which uses freely floating secondary flaps to obviate the need for control and actuation mechanism.

SUMMARY OF THE INVENTION

Briefly stated, the invention is directed to an annular convergent-divergent plug nozzle for use with a jet engine which comprises an exhaust duct with a concentric plug spaced within the duct and cooperating therewith to form a throat which is followed by an annular exhaust outlet, the plug having a longitudinal section which includes a divergence to maximum diameter at the nozzle throat and a convergence therebeyond. Means, such as a conventional flap, are provided to vary the throat area, and a plurality of secondary flaps is hinged to the duct downstream of the throat to form a secondary nozzle. The nozzle includes means for causing the downstream ends of the secondary flaps in a subsonic or low transonic flight regime to have an opening diameter which is no greater than the maximum diameter of the plug, which means can include a structure in which free floating secondary flaps are positioned by a pressure difference thereacross. Additional means are provided for cooling the exposed aft portion of the nozzle plug.

As will apparent, the nozzle is not limited to a circular shape but may be of rectangular or other shapes. For simplicity, the invention is described in connection with the conventional circular type plug nozzle. However, such terms as "annular" and "plug" and "concentric" are only intended to indicate a perimeter opening, a center body, and a surrounding member in the general environmental arrangement of the unique nozzle described and claimed. Thus, such terms are not to be construed as limiting in the sense of circular only but are intended to cover all such obvious non-circular modifications.

DESCRIPTION OF THE DRAWINGS

While the specification concludes with claims particularly pointing out and distinctly claiming the subject matter which is regarded as the invention, it is believed the invention will be better understood from the following description taken in connection with the accompanying drawing, in which:

FIG. 1 is a diagrammatic cross-sectional view of a typical turbojet engine employing the nozzle of the invention;

FIG. 2 is an enlarged diagrammatic view of the nozzle in the dry or subsonic position with the nozzle closed;

FIG. 3 is a view similar to FIG. 2 showing the nozzle in the open position during afterburning or supersonic operation; and FIG. 4 is a partial diagrammatic view of a modified nozzle applied to a fan engine.

DESCRIPTION OF THE PREFERRED EMBODIMENTS

Referring first to FIG. 1, there is shown a typical diagrammatic view of a turbojet engine. Such an engine comprises the usual inlet, compressor, combustion and turbine sections all generally indicated at 10 in the well known manner. For ease of illustration, a straight turbojet type engine will be described although it will be apparent that the invention is applicable to a bypass fan type engine. The customary exhaust gases from such an engine 10 are directed through an inner exhaust gas duct 14 and are exhausted through a nozzle generally indicated at 16 to produce thrust. In the engine described a bypass or secondary duct 17 is provided by means of a casing or nacelle 18, which, for the purposes of the invention to be described, may obtain its air from any source as shown in FIG. 1 or may be used to purge other parts of the engine or remove excess fluid wherever desired such as for cooling.

In order to obtain thrust, nozzle 16 may include a concentric plug 20, having a longitudinal section which diverges from a first diameter at the nozzle 16 entrance to maximum diameter at the nozzle throat and converges therebeyond, to operate in conjunction with a plurality of peripherally spaced main flaps 22 around duct 14. The flaps are hinged to the duct at 24 and are rotated by means of actuator 26 to vary the area of throat 28 and change the thrust. Variation may also be obtained by moving the plug axially in a well known manner.

For additional control of the thrust fluid exiting through the annular throat formed between flaps 22 and the plug 20, secondary flaps 30 may be provided radially outward of throat 28. In the case of the engine as shown in FIG. 1, these are pivoted to casing 18 at 31 preferably downstream of the throat as better shown in FIG. 2. It will be seen that secondary flaps 30 thus control the expansion of exhaust gases for either subsonic or supersonic operation. In order to obtain more exact control of the flow emanating from the nozzle, the secondary flaps 30 may be provided with inner wall flaps 32 that are secured, such as by pivoting at 34 beyond the throat at the downstream end of secondary flaps 30. These inner wall flaps 32 are designed to extend upstream as shown and to form, with the outer wall 36 of the plug, a diverging flow passage. In other words, the wall flaps and plug surface 36 converge toward the nozzle throat to form a diverging flow path with the plug. Additionally, it will be noted that the upstream end of the wall flaps 32 preferably is upstream of the throat 28 of the primary nozzle (but may extend slightly downstream thereof under certain operating conditions as shown in FIG. 3) and the upstream end curves radially outwardly at 40 from the plug.

It is desirable to maintain an annular opening 42 between main flaps 22 and inner wall flaps 32 so that secondary air may enter the discharge portion of the nozzle. This secondary air may come from any suitable source and even include air that has been used for purging, cooling, or inlet matching purposes upstream.

At the subsonic operation shown in FIG. 2, the nozzle operates at low pressure ratios. As a result of this operation, the internal area ratio, which is the ratio of the exit area between the pivot 34 and the outer wall 36 to the area at the throat 28 must be kept fairly low. Consequently, with this area ratio and pressure ratio combination being kept low, the pressures along inner wall flaps 32 are lower than the pressure around the outer surface of secondary flap 30. As a result, there is a net closing force because of a positive pressure difference across the flaps 30 and 32. This is caused because of the divergent passage between surface 36 and flap 32 so that supersonic acceleration results in a low pressure in that area. Consequently, the secondary flaps 30 tend to close to the position shown in FIG. 2. Thus, the secondary flaps assume the correct position for subsonic cruise as therein shown. This is obtained by having an actuator 26 for the primary or main flaps 22 and allowing the secondary flaps 30 to float and assume the proper position by virtue of the pressure difference across the flaps. Consequently, no complex actuating mechanism is required for efficient operation of the nozzle in the subsonic or cruise position of FIG. 2; however, positive mechanical actuation of the secondary flaps 30 may be desired to provide optimum area variation with flight conditions. In either event, as can be seen in FIG. 2 by reference to the broken horizontal line 43, at subsonic and low transonic operation the opening formed by the aft end of flaps 30 has a diameter $D_1$, which is no greater than diameter $D_2$, the maximum diameter of the plug 20. This can be assured in the case of positively actuated flaps 30 by scheduling the actuators to maintain such a relationship and in the case of free floating flaps 30 by providing a flap 30, plug 20, and primary nozzle 22 combination in which the aerodynamic forces on flaps 30 will balance at the desired relationship during subsonic and low transonic flight. Thus there will be provided a nozzle which effectively masks hot internal engine parts from the view of infrared sensing devices.

To further suppress infrared radiation from the aft portion of the engine, plug 20 and inner wall flaps 32 are film cooled in order to reduce their radiation. cooling air is provided to walls 36 of plug 20 through openings 46 from a source such as compressor discharge and is provided to wall flaps 32 through annular openings 42.

In order to maintain the annular opening 42 and to maintain a positive relationship between the upstream end or curve 40 of wall flaps 32 and the downstream end of main flaps 22 so that 40 is always radially outward of the trailing edge of flaps 22, any suitable connecting means is used to join the inner wall flaps 32 and the main flaps 22. The connecting means acts as a stop to maintain the trailing edge of the main flap in a desired spaced relation with and closer to the plug than the wall flaps 32 but does not actuate the secondary flaps 30. The particular spacing arrangement depends on the amount of pumping that the ejector nozzle is designed to deliver, the application for which the nozzle is assigned, as well as other operating parameters. The connecting means may conveniently be in the form of a simple link 44 that prevents the upstream curve 40 from dropping below the trailing edge of main flaps.

Referring next to FIG. 3, the nozzle is shown in its supersonic or afterburning position wherein a convergent-divergent nozzle is desired. The same numbers refer to the same parts. In this position of operation, the pressure ratios are much higher and it is desired that the area ratio also be increased. The result of the high pressure ratio is that the pressure on the inner wall flaps 32 is higher than ambient and the secondary flaps 30 float to the open or expanded position as shown in FIG. 3. Again, no secondary flap actuating structure is required and the nozzle assume its correct operating position. In this position the upstream ends 40 of the inner wall flaps 32 provide the annular opening 42 and again are disposed radially outwardly of the main flaps 22. The link 44 merely acts as a stop for outer travel of secondary flaps 30.

It should be noted that, while the secondary flaps 30 float as just described, suitable stops that may be part of link 44 may be provided at the outer extremity shown in FIG. 3 and at the inner extremity shown in FIG. 2. These merely ensure the end position of operation of the secondary floating flaps. As noted above, the link 44 may be act as a stop in the two positions although other means may obviously be used.

Referring next to FIG. 4, there is shown a modification that might be applied to a fan engine. In this modification, a duct 48 has a central plug 50 disposed therein generally to operate as described above. A splitter 51 divides the outer fan flow and inner exhaust flow which flows are discharged through a nozzle. To provide a nozzle and throat, plug 50 may be equipped with known means 52 to blow it up to vary the throat area formed between an inwardly converging member 54 which may be fixed or pivoted on duct 48. The coverging portion of the nozzle is formed with plug in the usual manner as described above. The diverging portion is formed by the secondary flaps 56 that roate about a pivot 58 between the subsonic solid line closed position shown wherein diameter $D_1$ defined by the aft end of flaps 56 in no greater than diameter $D_2$, the maximum diameter of plug 50 and high speed supersonic position shown dotted. Film cooling for plug 50 and the inner surface of flap 56 can be provided similarly to that described with reference to FIG. 2. The operation is substantially identical to that previously described and can include positive actuation of flaps 56 if desired; however the scondary flaps can be positioned by the pressure differential across the flaps and thus require no actuating structure.

While there have been described preferred forms of the invention, obvious equivalent variations are possible in light of the above teachings. It is therefore to be understood that within the scope of the appended claims, the invention may be practiced otherwise than as specifically described, and the claims are intended to cover such equivalent variations.

I claim:

1. In a gas turbine engine including means for suppressing infrared radiation from the interior of said engine, said means comprising, a propulsive nozzle including an inner plug having a longitudinal section which deverges from a first diameter at the nozzle inlet to a maximum diameter and converges therebeyond;

a casing surrounding said plug and forming a duct concentric with said plug;

flap means pivotally connected to said casing and forming an extension thereof;

said plug, casing, duct and flap means defining an annular nozzle coverging to a throat and diverging therebeyond wherein in a subsonic flight the flap means are disposed convergently with respect to each other and form in combination with the plug a flow path of minimum divrgence for the hot gas stream, and at supersonic flight speeds are displaced outwardly to form a flow path of maximum divergence with respect to said plug; p1 said flap means including a plurality of main flaps defining said throat and a plurality of secondary flaps, said secondary flaps comprising inner and outer wall members, said outer wall members being pivotally connected to the downstream end of said casing and said inner wall members being pivotally connected to the downstream end of said outer wall members, said inner and outee wall members forming a cavity therebetween;

said nozzle including means for causing the downstream ends of said outer wall members in said subsonic flight conditions to have a dimaeter no greater than the said maximum diameter of said plug;

said nozzle thereby effectively suppressing infrared radiation from the interior fo said engine.

2. A propulsive nozzle as recited in claim 1 wherein saidinner and outer wall members have essentially equal areas.

3. A propulsive nozzle as recited in claim 2 wherein means are provided for maintaining a secondary air passage between the main flaps and the upstream ends of said inner wall members.

* * * * *